US 7,292,557 B2

(12) United States Patent
Neumann et al.

(10) Patent No.: US 7,292,557 B2
(45) Date of Patent: Nov. 6, 2007

(54) MASTER-SLAVE PROCESSOR FOR DUAL MODE MOBILE TELEPHONE

(75) Inventors: Thomas Neumann, San Diego, CA (US); Bodo Zeug, Beijing (CN)

(73) Assignee: Siemens Communications, Inc., Boca Raton, FL (US)

( * ) Notice: Subject to any disclaimer, the term of this patent is extended or adjusted under 35 U.S.C. 154(b) by 849 days.

(21) Appl. No.: 10/096,233

(22) Filed: Mar. 8, 2002

(65) Prior Publication Data

US 2002/0141441 A1    Oct. 3, 2002

Related U.S. Application Data

(60) Provisional application No. 60/276,811, filed on Mar. 15, 2001.

(51) Int. Cl.
*H04B 7/212*    (2006.01)

(52) U.S. Cl. ........................ 370/337; 455/553

(58) Field of Classification Search ............ 370/320, 370/342–345, 347, 478–480, 498; 455/552.1
See application file for complete search history.

(56) References Cited

U.S. PATENT DOCUMENTS

| 6,085,085 A * | 7/2000 | Blakeney et al. ......... 455/426.1 |
| 6,934,558 B1 * | 8/2005 | Sainton et al. ........... 455/552.1 |
| 6,947,721 B2 * | 9/2005 | Pritchett et al. ......... 455/343.1 |
| 2002/0059434 A1 * | 5/2002 | Karaoguz et al. ........... 709/228 |
| 2002/0141441 A1 | 10/2002 | Neumann et al. |

* cited by examiner

*Primary Examiner*—Chi Pham
*Assistant Examiner*—Phuc H Tran

(57) ABSTRACT

A wireless telephone includes first and second baseband processors. The first baseband processor (GSM) functions as system master, and the second processor (TDMA) functions as system slave. The first baseband processor interfaces to system controls, such as power supply, man-machine interface (MMI), and the like.

19 Claims, 7 Drawing Sheets

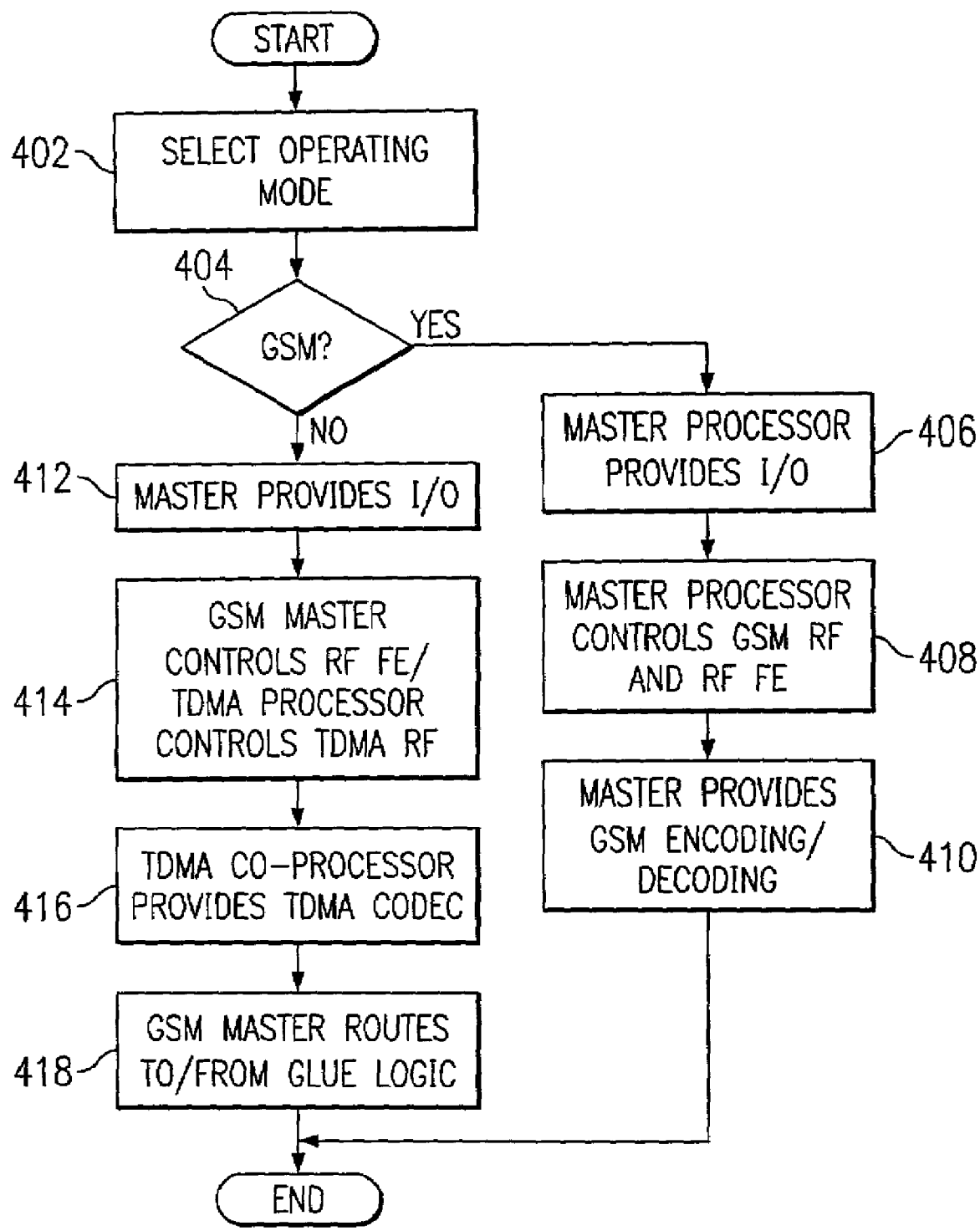

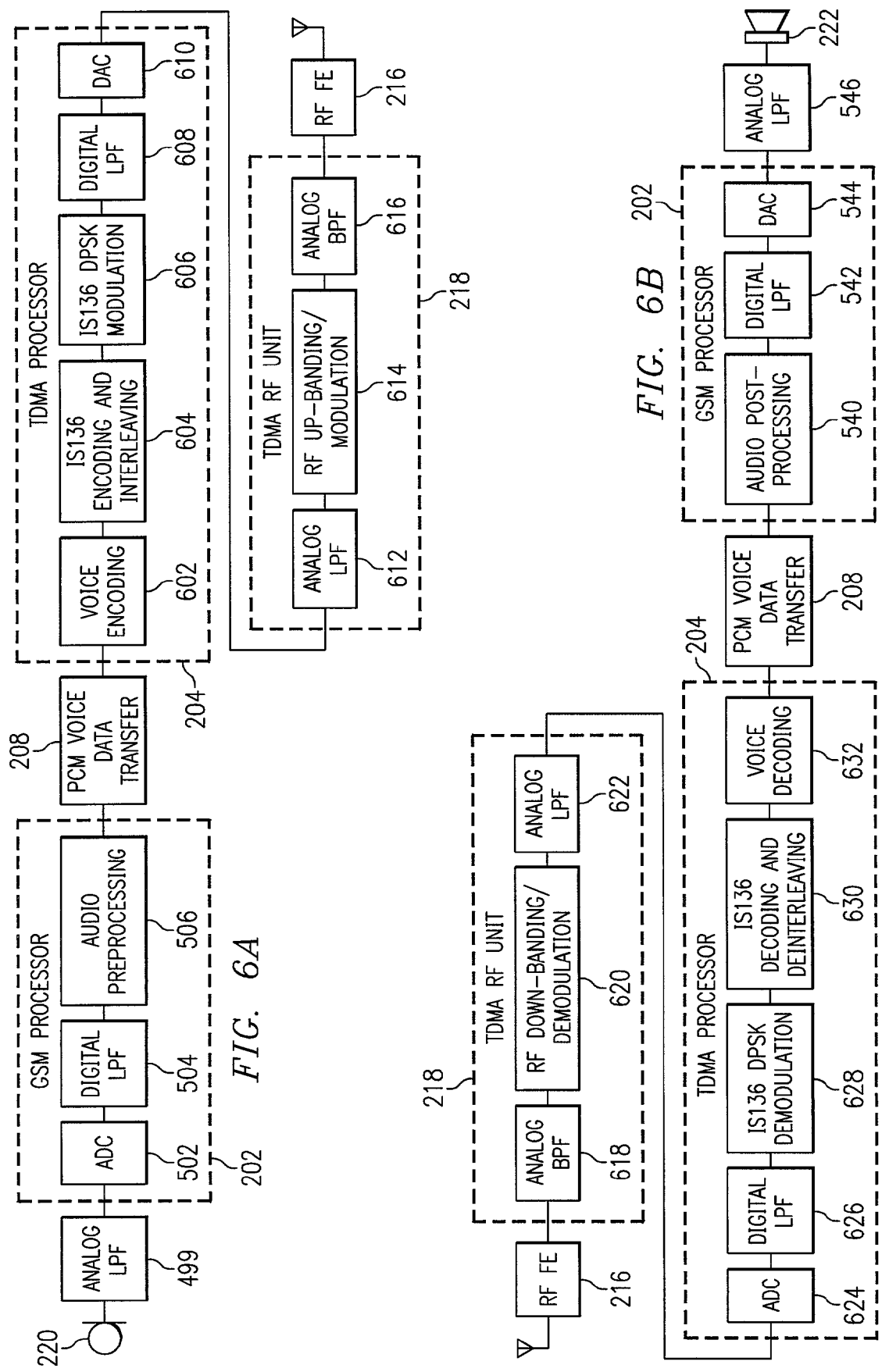

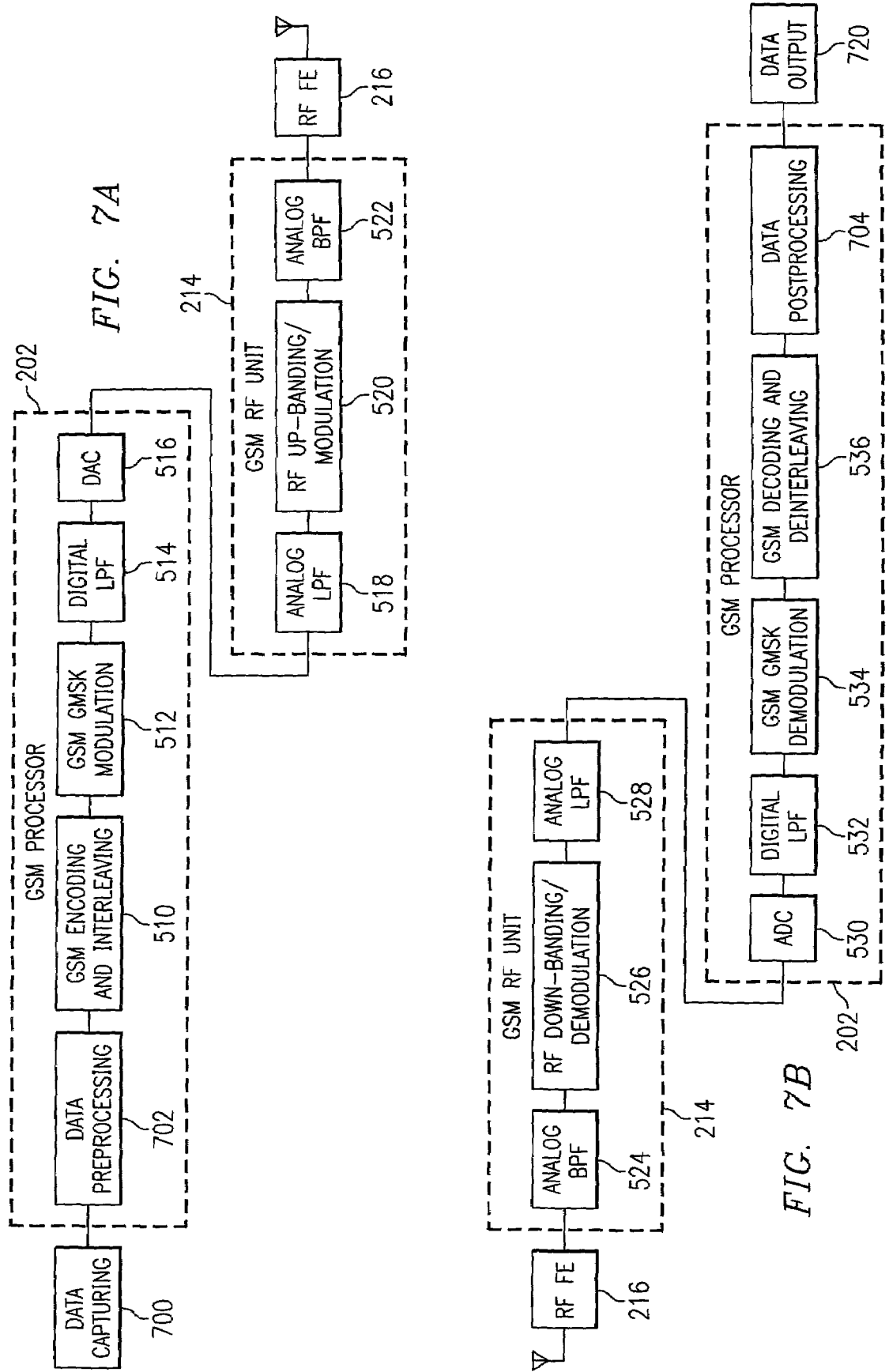

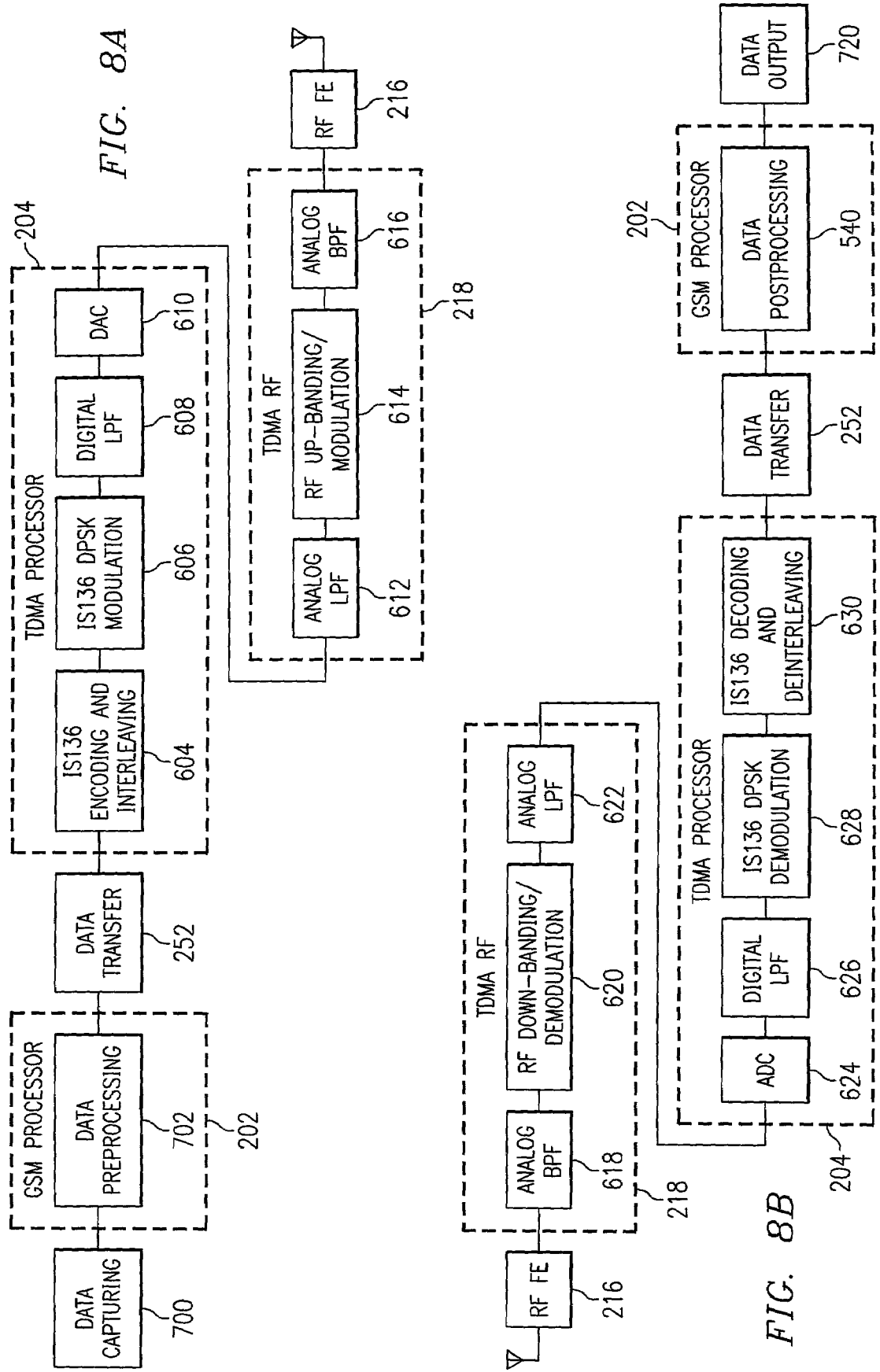

MASTER-SLAVE PROCESSOR FOR DUAL MODE MOBILE TELEPHONE

CROSS REFERENCE TO RELATED APPLICATION

This application claims priority from U.S. Provisional Application Ser. No. 60/276,811, filed Mar. 15, 2001, titled "Master-Slave Dual Processor Design," which is hereby incorporated by reference in its entirety as if fully set forth herein.

BACKGROUND OF THE INVENTION

This invention relates to mobile telephony and, in particular, to an improved dual mode mobile telephone.

A variety of standards have been developed for digital cellular and PCS telephone systems, based on a variety of bandwidth allocation techniques. These include the European time division multiple access (TDMA)-based Global System for Mobile communication (GSM), and the Telecommunications Industry Association (TIA) IS-136 TDMA standard (also known as North American TDMA). TDMA systems allocate unique time slots to each user within a single radio-frequency channel.

Each of these systems has widespread deployment. However, a user of a cellular telephone or PCS device that complies with one standard is inoperable in a network communicating according to another. Thus, typically, a user would need multiple such devices to operate in each such network. Alternatively, "dual-mode" telephones have been developed, in which the telephone is useable in two networks. However, such telephones typically require a complete baseband chipset to be provided for each of the two wireless or cordless standards. This can result in an undesirably long development time for each chipset. Moreover, each such telephone requires a unique design, which can add to development costs.

SUMMARY OF THE INVENTION

These and other drawbacks in the prior art are overcome in large part by a system and method according to the present invention.

According to a specific embodiment, the present invention provides a dual mode digital communication device. The device includes a master baseband processor adapted to provide baseband functions according to a first telecommunications standard in a first mode, and a slave baseband co-processor adapted to provide baseband functions according to a second telecommunications standard in a second mode. The master baseband processor is adapted to select the first mode or second mode and control a plurality of shared interface functions.

According to another specific embodiment, the present invention provides a method including steps of providing a master baseband processor adapted to provide baseband functions according to a first telecommunications standard in a first mode, and providing a slave baseband co-processor adapted to provide baseband functions according to a second telecommunications standard in a second mode. The master baseband processor is adapted to select the first mode or second mode and control a plurality of shared interface functions.

According to another specific embodiment, the present invention provides a dual mode telecommunications device. The device includes a first baseband processor and a second baseband processor. The first baseband processor is adapted to provide baseband functions according to a first telecommunications standard in a first mode and adapted to provide a control interface for the first mode and a second mode. The second baseband processor adapted to provide baseband functions in said second mode according to a second telecommunications standard.

According to yet another embodiment, the present invention provides a dual mode telecommunications device including a first processor implementing a first telecommunications standard and a second processor coupled to the first processor and the control interface and implementing a second telecommunications standard. The first processor is adapted to provide a control interface for the second processor.

A better understanding of the invention is obtained when the following detailed description is considered in conjunction with the following drawings.

BRIEF DESCRIPTION OF THE DRAWINGS

FIG. 4 is a flowchart illustrating operation of a system according to an embodiment of the present invention;

FIG. 6A and FIG. 6B illustrate uplink and downlink TDMA handling for a voice call according to an embodiment of the present invention;

FIG. 7A and FIG. 7B illustrate uplink and downlink GSM handling for a data call according to an embodiment of the present invention;

FIG. 8A and FIG. 8B illustrate uplink and downlink TDMA handling for a data call according to an embodiment of the present invention.

DETAILED DESCRIPTION OF THE INVENTION

A wireless telephone according to an embodiment of the present invention includes first and second baseband processors. The first baseband processor functions as system master, and the second processor functions as system slave. The first baseband processor interfaces to system controls, such as power supply, man-machine interface (MMI), and the like.

A wireless telephone according an embodiment of the present invention includes a GSM master baseband processor and a TDMA slave co-processor. Functions dedicated to the GSM master processor include GSM system functions and control of the GSM radio frequency (RF) functions. Functions dedicated to the slave co-processor include TDMA system functions and control of the TDMA RF functions. The master processor also controls a variety of shared functions, including, for example, RF front end, display, keypad, accessories, battery, audio path, and slave processor watchdog, charging, power down, reset, etc., functions.

A wireless telephone according to another embodiment of the invention includes a GSM master processor for implementing GSM functionality in a first mode and a TDMA IS-136 co-processor for providing IS-136 functionality in a second mode. The GSM master processor controls audio input/output and an RF front end circuit in both the first and second modes. The GSM master processor controls GSM coding/decoding in the first mode, and the TDMA co-processor controls TDMA IS-136 coding/decoding in the second mode. A logic interface unit for voice data during a voice call couples the GSM master processor to the TDMA co-processor, providing a synchronous I/O on the GSM master processor side, and an asynchronous I/O on the TDMA co-processor side. The GSM master processor is clocked at a first frequency and the TDMA co-processor is clocked at a second frequency. A control link interface is provided for data during a data call.

Figure 1:
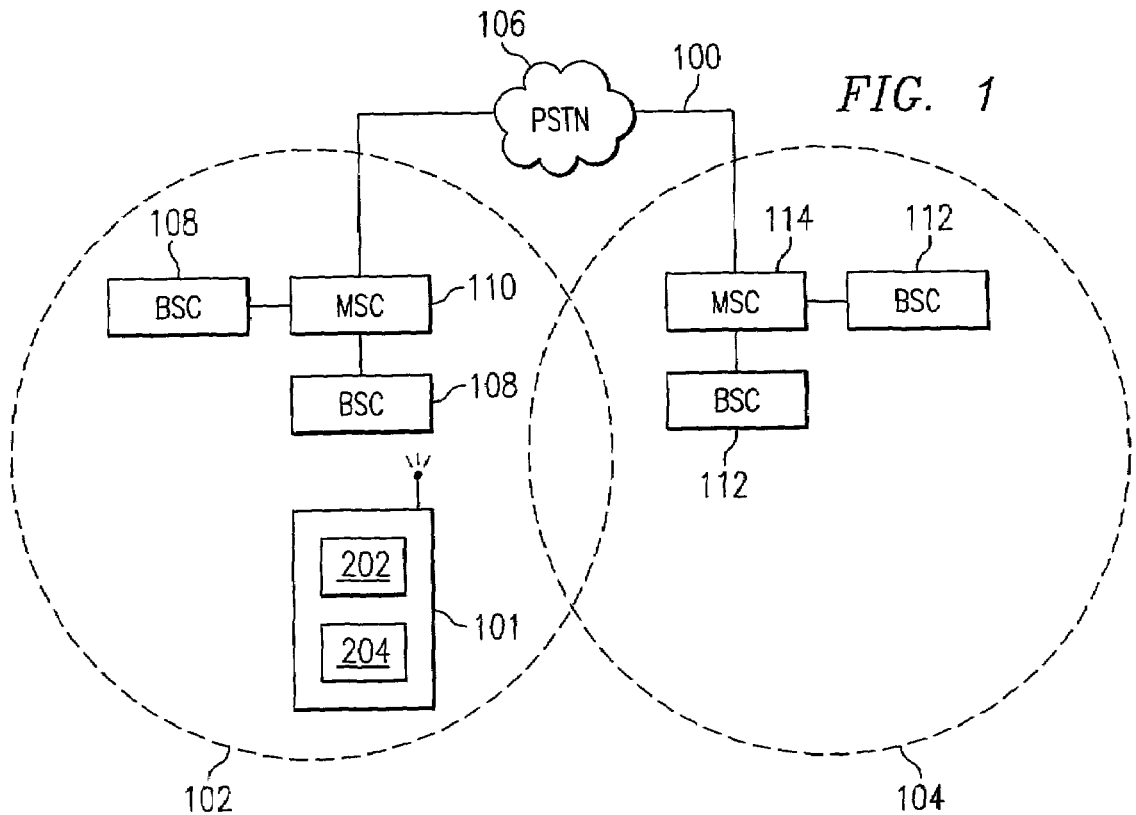
FIG. 1 is a diagram of a telecommunications system according to an embodiment of the present invention.

Turning now to the drawings and, with particular attention to FIG. 1, a diagram of a telecommunications system according to an embodiment of the present invention is shown and generally identified by the reference numeral 100. The system 100 includes a first region of operation 102 and a second region of operation 104. The first region 102 may be a GSM network, while the second region 104 may be a TDMA IS-136 network. Further, the regions 102, 104 may be overlapping as shown, or may be geographically distinct. As will be explained in greater detail below, a telecommunications device 101 according to embodiments of the present invention is operable in either the first region 102 or the second region 104.

The first region 102 includes one or more GSM base station controllers (BSC) 108 operably coupled to a GSM mobile switching center (MSC) 110. The GSM-BSC 108 and GSM-MSC 110 may operate in compliance with known systems used to implements GSM networks. The GSM-MSC 110 couples to the public switched telephone network (PSTN) 106.

The second region includes one or more IS-136 TDMA base station controllers (BSC) 112 and TDMA mobile switching centers (MSC) 114. The TDMA-BSC 112 and TDMA-MSC 114 may operate in compliance with known systems used to implements TDMA IS-136 networks. The TDMA-MSC 114 couples to the public switched telephone network (PSTN) 106.

Finally, as will be explained in greater detail below, the telecommunications device 101 includes a master processor 202 and a slave processor 204. In one embodiment, the master processor 202 is a GSM baseband processor that controls GSM codec (encoding/decoding) functions and also controls various input/output functions for the telecommunications device. The slave processor 204 is a TDMA IS-136 baseband processor that handles IS-136 codec functions.

Figure 2:
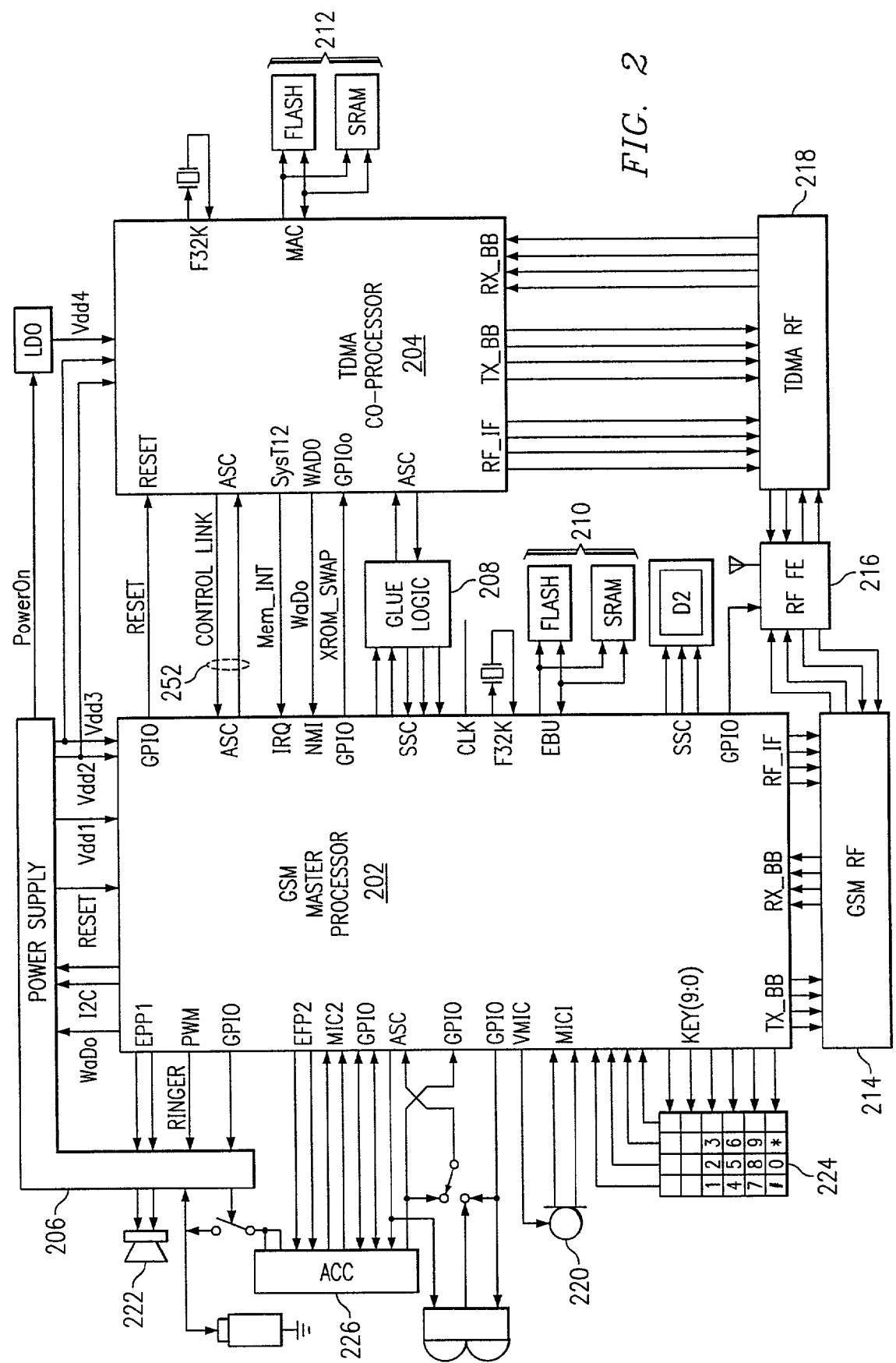
FIG. 2 is a block diagram of a telecommunications device according to an embodiment of the present invention.

More particularly, FIG. 2 is a block diagram of a telecommunications device 101 according to an embodiment of the present invention. As noted above, in the embodiment illustrated, the telecommunications device 101 includes a GSM master processor 202 and a TDMA IS-136 slave co-processor 204. The GSM master processor 202 interfaces to a power supply controller 206 and various I/O devices, such as a microphone 220, a speaker 222, keypad 224, and accessory interface 226. The GSM master processor 202 also couples to memory 210, such as Flash memory and static random access memory (SRAM). In addition, as will be explained in greater detail below, the GSM master processor 202 couples to a GSM RF unit 214 and an RF front end (FE) unit 216.

The GSM master processor 202 also couples directly and via interface or "glue" logic 208 to the TDMA co-processor 204. In one embodiment, the glue logic 208 provides various synchronization logic between the GSM master processor 202 and the TDMA co-processor 204 and, in particular, provides an asynchronous serial interface (ASC) to the TDMA co-processor and a synchronous serial interface to the GSM master processor 202.

The TDMA co-processor 204 further couples to memory 212, such as Flash memory and/or static random access memory (SRAM), and to a TDMA RF unit 218. The TDMA RF unit 218 further couples to the RF front end unit 216.

In operation, the TDMA co-processor 204 controls TDMA system related functions and the TDMA RF unit 218. The GSM master processor 202 controls all GSM system related functions and the GSM RF unit 214. In addition, the GSM master processor 202 controls the RF front end 216, the power supply 206, and the input/output functions, such as display, keypad and audio path. The GSM master processor 202 also controls the TDMA co-processor 204.

For example, the GSM master processor 202 provides reset control of the TDMA co-processor 204 via the reset control link 250. Once the GSM master processor 202 has been reset by the system, the RESET signal to the TDMA co-processor 204 forces the TDMA co-processor 204 to reset. In addition, the GSM master processor 202 controls whether the TDMA co-processor 204 is booted by an internal or external command via a separate control signal via an I/O pin.

All commands and data, except audio data, from the GSM master processor 202 to the TDMA co-processor 204 are transferred via a dedicated asynchronous interface 252. The GSM master processor is booted directly via the accessory interface 226. The TDMA co-processor 204 is booted via the same interface 226, with all data being passed from the GSM master processor 202 via the control interface 252. The GSM master processor also functions as system watchdog and watches the TDMA co-processor's watchdog on a non-maskable interrupt (NMI). If any violation occurs, the GSM master processor executes an exit routine.

The GSM master processor 202 controls the power supply unit 206. For example, the GSM master processor 202 may implement a known battery charging algorithm and supervise, e.g., voltage and temperature measurements. During an active GSM connection, the GSM master processor receives relevant timing information from the internal system timer (not shown). During a TDMA connection, the timing information is acquired from an external interrupt derived from a system timer of the TDMA co-processor 204.

Finally, during a GSM call, the entire voice functionality except voice encoding/decoding is provided via the GSM master processor 202. During a TDMA call, all relevant voice data is transmitted from the GSM master processor via the glue logic 208, which provides a synchronous interface on the GSM processor side and an asynchronous interface on the TDMA processor side. The glue logic 208 may be any circuitry that can provide such an interface between the processors.

Figure 3:
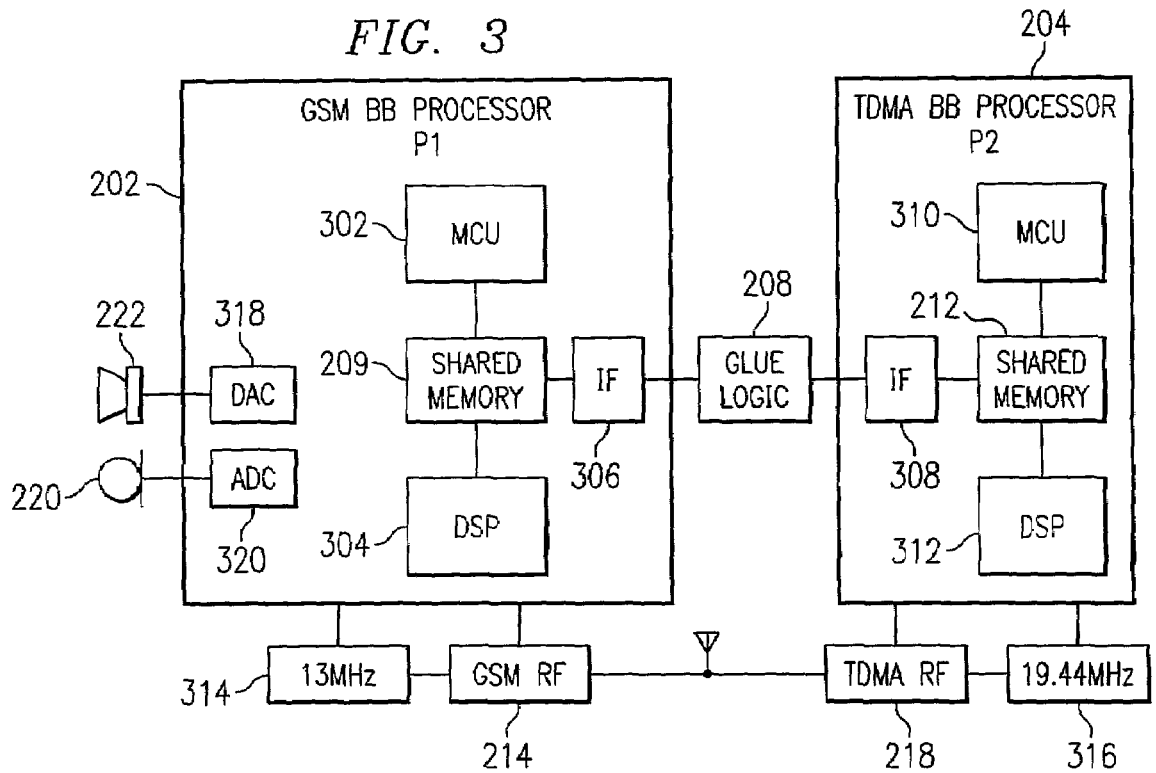
FIG. 3 is a more detailed diagram of the telecommunications device of FIG. 2.

FIG. 3 illustrates in greater detail various aspects of the audio functionality of the system 101. Shown are the GSM master processor 202 and the TDMA co-processor 204. The GSM master processor 202 includes a master control unit (MCU) 302 and a DSP 304. The MCU 302 and DSP 304 share a memory 209, which may be on-chip memory. The GSM master processor 202 interfaces to the glue logic 208 via interface 306. Also shown in the GSM master processor 202 are a digital to analog converter 318 and an analog to digital converter 320 for interfacing the speaker 222 and microphone 220, respectively. A 13 MHz clock 314 couples to the GSM master processor 202 and the GSM RF unit 214.

Similarly, the TDMA co-processor 204 includes MCU 310 and DSP 312. Again, a shared memory 212 may be provided on chip. A 19.44 MHz clock 316 couples to the TDMA co-processor 204 and the TDMA RF unit 218. The TDMA co-processor 204 interfaces to the glue logic 208 via interface 308.

In certain embodiments of the present invention, during TDMA mode, the TDMA co-processor provides only IS136 encoding/decoding, voice encoding/decoding and control of TDMA RF. Any other processing is provided by the GSM master processor.

In operation, the master control unit 302 of the GSM master processor 202 selects the mode of operation, e.g., whether GSM mode or TDMA IS-136 mode. If GSM mode is selected (e.g, by detection of known GSM control signals, or by factory pre-set or manual user selection), then the GSM master processor 202 directs the TDMA processor 204 to enter a shut down or standby mode.

The MCU 302 then supervises GSM operation. Thus, audio input is received via microphone 220 and converted to digital using ADC 320. The MCU 302 then supervises the DSP 304, which performs any necessary filtering and encoding, and the like. The voice signals are then provided to the GSM RF unit 214 and the RF front end (FIG. 2), which perform RF modulation functions, and then transmitted to the network. Similarly, in the downlink direction, signals are received at the front end 216 and demodulated in the GSM RF unit 214. The signals are then received at the DSP 304, filtered and decoded, then converted to analog using DAC 318, and then provided out speaker 222.

If the TDMA mode is selected, however, both the GSM master processor 202 and the TDMA co-processor 204 are in an operational mode. In the TDMA mode, audio signals are received through microphone 220 and converted to digital using ADC 320. The signals are then provided across interface 306, glue logic 208, and interface 308 to the TDMA co-processor 204. The MCU 302 and MCU 310 may exchange various control signaling, as well. The MCU 310 of the TDMA co-processor 204 then supervises TDMA functioning. Thus, the signals are provided to the DSP 312 for filtering and encoding and then to the TDMA RF 218 for modulation. The modulated signals are then provided to the RF front end 216 (FIG. 2), which is controlled by the GSM master processor 202. The signals are then transmitted.

For receiving, the signals are received at the RF front end 216 and provided to the TDMA RF unit 218 for demodulation. The demodulated signals are then received at the DSP 312 and filtered, decoded and voice decoded. The MCU 310 then supervises transporting the signals via the IF 308 to the glue logic 208 and then the IF 306. The DSP 304 then performs all post processing and provides the data signals to the DAC 318 and out speaker 222.

Turning now to FIG. 4, a flowchart illustrating functionality provided by a telecommunications device according to an embodiment of the present invention is shown. In 402, an operating mode (e.g., GSM or IS-136) is selected. As noted above, this may be done either by the system detecting whether a GSM or IS-136 base station is present; or by a manual selection; or by a factory pre-set, according to various embodiments. If the device is operating in GSM mode, as determined in step 404, then in 406, the GSM master processor 202 provides the user interface, and audio input/output controls. In 408, the master processor 202 also controls the GSM RF functions (e.g., modulation/demodulation) and also controls an RF front end circuit 216. In 410, the GSM master processor 202 also controls GSM coding and decoding functionality.

In step 404, if the mode was determined to be the IS-136 mode, then in step 412, the master would again provide the user interface and audio I/0 functions. In step 414, the GSM master processor 202 further controls the RF front end 216, but the TDMA co-processor controls the TDMA RF functions. In step 416, the TDMA co-processor handles TDMA IS-136 coding and decoding functions, and the GSM master processor controls signal and data routing between the processors, with the data being transmitted via the interface glue logic in step 418.

Figure 5A:
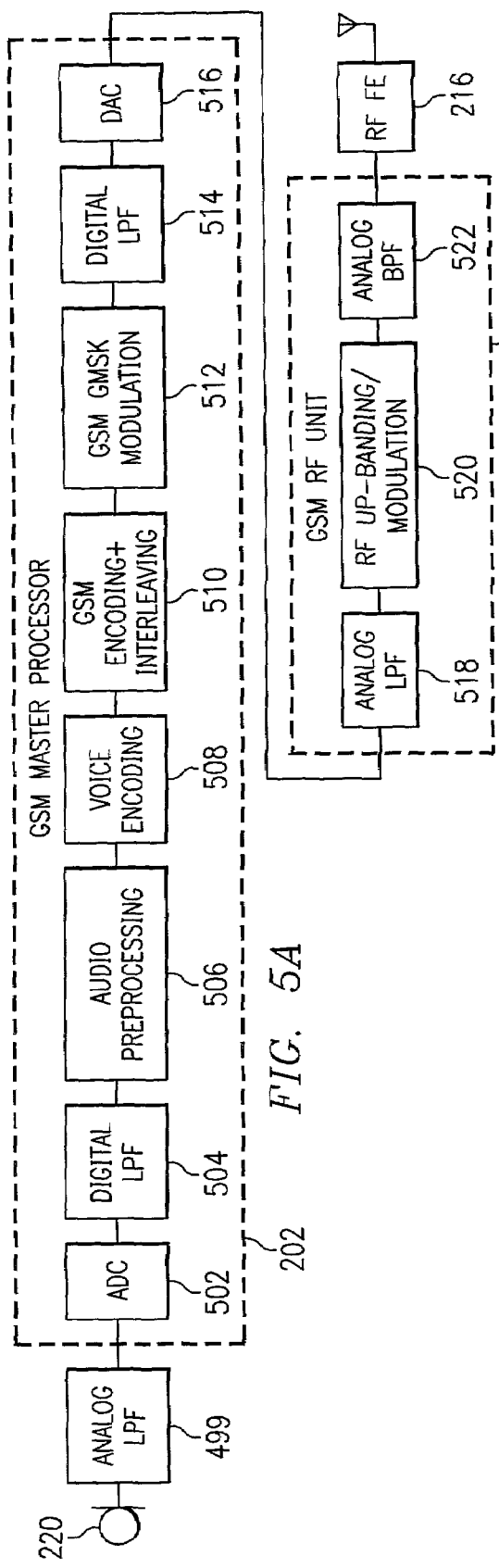
FIG. 5A and FIG. 5B illustrate uplink and downlink GSM handling for a voice call according to an embodiment of the present invention.
Figure 5B:
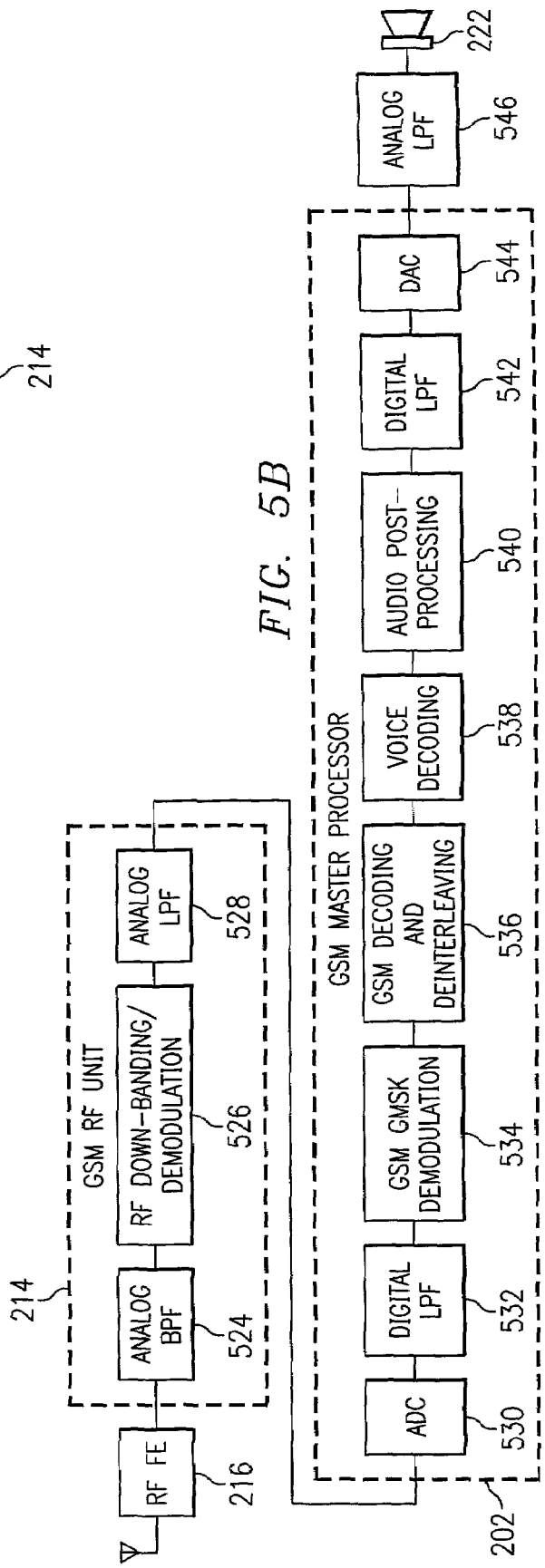

FIG. 5A and FIG. 5B illustrate the uplink and downlink handling, respectively, of GSM voice calls according to an embodiment of the present invention. The system receives voice data as input over the microphone 220. After low pass filtering using discrete filter 499, the data are then processed by the GSM processor 202, the GSM RF unit 214 and then the RF front end unit 216. In particular, in the GSM processor 202, the voice signals are analog-to-digital converted by ADC 502 and then filtered using audio filter 504. An audio preprocessing unit 506 performs preprocessing such as noise reduction and echo cancellation. The system then performs voice encoding using voice encoding unit 508, and GSM encoding/interleaving at GSM encoding unit 510. Next, the GSM modulation unit 512 performs GSM modulation (GMSK), and the modulated signals are filtered at GSM lowpass filter 514 and digital analog converted at DAC 516. The GSM RF unit 214 then performs analog low pass filtering at filter 518, RF upband and modulation at unit 520, and analog bandpass filtering at BPF 522. The voice signals are then transmitted at RF FE 216.

Downlink handling of GSM voice data is similar, and is shown in FIG. 5B. Radio signals are received at the RF front end 216 and then handed off to the GSM RF unit 214. The GSM RF unit 214 performs bandpass filtering 524, RF downbanding and demodulation 526, and low pass filtering at unit 528 before the signal is provided to the GSM processor 202. The GSM processor 202 performs analog to digital conversion at ADC 530, lowpass filtering 532, GSM signal demodulation and equalization 534, GSM decoding and de-interleaving 536, voice decoding 538; audio postprocessing 540; audio filtering 542; and digital to analog conversion 544. The audio is then low pass filtered again at unit 546 and output at speaker 222.

Uplink and downlink voice TDMA are illustrated in FIGS. 6A and 6B. Audio data is received at the microphone 220, low pass filtered at 499 and provided to the GSM processor 202. The GSM processor 202 performs analog to digital conversion 502, audio filtering 504, and audio preprocessing 506 (e.g., noise reduction and echo cancellation). A PCM data transfer via logic 208 transfers the data to the TDMA processor 204. The TDMA processor 204 then performs voice encoding 602, TDMA encoding/interleaving 604, TDMA signal modulation (DPSK) 606, TDMA low pass filtering 608 and digital-to-analog conversion 610. The signals are then provided to the TDMA RF unit 218 for low pass filtering at 612, upbanding and modulation at 614, and band pass filtering at 616. Finally, the signals are transmitted at the RF front end 216.

Downlink voice TDMA is similar, and is shown in FIG. 6B. Signals are received at the RF front end 216 and provided to the TDMA RF unit 218 for bandpass filtering 618, RF downbanding and demodulation 620, and low pass filtering 622. The TDMA processor 204 then performs analog to digital conversion 624, TDMA lowpass filtering 626, TDMA signal demodulation 628, TDMA decoding/de-interleaving 630, and voice decoding 632. A PCM data transfer using logic 208 then transfers the data to the GSM processor 202. The GSM processor 202 then performs audio postprocessing 540, audio filtering 542, and digital to analog conversion 544. The signal is filtered at LPF 546 and output at speaker 222.

FIG. 7A and FIG. 7B illustrate handling of GSM data calls according to an embodiment of the present invention. FIG. 7A illustrates the uplink side. At 700, data are captured (e.g., UART or IrDA). The captured data are provided to the GSM processor 202, which performs data pre-processing 702, GSM encoding/interleaving 510, GSM signal modulation 512, GSM lowpass filtering 514, and digital-to-analog conversion 516. The GSM RF unit 214 then performs lowpass filtering 518, RF upbanding and modulation 520, and RF band pass filtering 522. The data are then transmitted using the RF front end 216.

Downlink handling is similar, as shown in FIG. 7B. The RF front end 216 receives the RF data signals. The GSM RF unit 214 performs RF bandpass filtering 524, RF downbanding and demodulation 526, and low pass filtering 528. The data are then provided to the GSM processor 202, which performs analog digital conversion 530, GSM lowpass filtering 532, GSM signal demodulation 534, GSM decoding/de-interleaving 536, and finally after data post processing 704, outputs the data at 720.

FIG. 8A and FIG. 8B illustrate uplink and downlink TDMA data handling, respectively. At 700, data are captured. The data are received at the GSM processor 202 for pre-processing 702 and transferred via logic 252 to the TDMA processor 204. The TDMA processor 204 performs TDMA encoding/interleaving 604, TDMA signal modulation 606, TDMA lowpass filtering 608 and digital-to-analog conversion 610. The signals are then sent to the TDMA RF unit 218, which performs low pass filtering 612, RF upbanding and modulation 614, and RF bandpass filtering 616. Finally, the signals are transmitted using RF front end 216.

Downlink handling (FIG. 8B) is similar. The radio signals are received by the RF front end 216 and sent to the TDMA RF unit 218 for bandpass filtering 618, RF downbanding and demodulation 620, and low pass filtering 622. The signals are then sent to the TDMA processor 204 for analog to digital conversion 624, TDMA lowpass filtering 626, TDMA signal demodulation 628, and TDMA decoding/de-interleaving 630. The demodulated data are then transferred to the GSM processor 202 for post-processing at 540 via the logic 208 and, finally, are output by the GSM processor at 720.

This disclosure is illustrative and not limiting. The particular materials disclosed and the parameters of their use are also illustrative and not limiting; one of ordinary skill in the field will appreciate that various substitutions and modifications can be made. In any case, such modifications or substitutions are intended to fall within the scope of the appended claims.

What is claimed is:

1. A dual mode digital communication device, comprising:
    a master baseband processor configured to provide baseband functions according to a first telecommunications standard in a first mode;
    a slave baseband co-processor configured to provide baseband functions according to a second telecommunications standard in a second mode;
    wherein said master baseband processor is configured to select said first mode or said second mode and control a plurality of shared interface functions;
    wherein user data is passed from the master baseband processor to the slave baseband co-processor in the second mode.

2. A dual mode digital communication device in accordance with claim 1, said first telecommunications standard comprising a first TDMA standard, and said second telecommunications standard comprising a second TDMA standard.

3. A dual mode digital communication device in accordance with claim 2, said first TDMA standard comprising GSM, and said second TDMA standard comprising IS-136.

4. A dual mode digital communication device in accordance with claim 1, said plurality of shared interface functions comprising man-machine interface functions.

5. A dual mode digital communication device in accordance with claim 1, said plurality of shared interface functions comprising power supply functions.

6. A dual mode digital communication device in accordance with claim 1, further including a first radiofrequency controller interfacing said master baseband processor and a second radiofrequency controller interfacing said slave baseband co-processor.

7. A method, comprising:
    providing a master baseband processor configured to provide baseband functions according to a first telecommunications standard In a first mode;
    providing a slave baseband co-processor configured to provide baseband functions according to a second telecommunications standard in a second mode;
    wherein said master baseband processor is configured to select said first mode or said second mode and control a plurality of shared interface functions;
    wherein user data is passed from the master baseband processor to the slave baseband co-processor in the second mode.

8. A method in accordance with claim 7, said first telecommunications standard comprising a first TDMA standard, and said second telecommunications standard comprising a second TDMA standard.

9. A method in accordance with claim 8, said first TDMA standard comprising GSM, and said second TDMA standard comprising IS-136.

10. A method in accordance with claim 7, said plurality of shared interface functions comprising man-machine interface functions.

11. A method in accordance with claim 7, said plurality of shared interface functions comprising power supply functions.

12. A method in accordance with claim 7, further including providing a first radiofrequency controller interfacing said master baseband processor and a second radiofrequency controller interfacing said slave baseband co-processor.

13. A dual mode telecommunications device, comprising:
    a first master baseband processor configured to provide baseband functions according to a first telecommunications standard in a first mode and configured to provide a control interface for said first mode and a second mode, said second mode comprising a second telecommunications standard;
    a second slave baseband processor configured to provide baseband functions in said second model,
    wherein user data is passed from the master baseband processor to the slave baseband co-processor in the second mode.

14. A dual mode telecommunications device in accordance with claim 13, said first mode comprising a first TDMA mode and said second mode comprising a second TDMA mode.

15. A dual mode telecommunications device in accordance with claim 13, said first master baseband processor adapted to control switching between said first mode and said second mode.

16. A dual mode telecommunications device in accordance with claim 13, further comprising a first RF control unit interfaced to said first master baseband processor, and a second RF control unit interfaced to said second slave baseband processor.

17. A dual mode telecommunication device in accordance with claim 14, said first TDMA mode comprising GSM, and said second TOMA mode comprising IS-136.

18. A dual mode digital communication device, comprising:

a master baseband processor configured to provide baseband functions according to a first telecommunications standard in a first mode;

a slave baseband co-processor configured to provide baseband functions according to a second telecommunications standard in a second mode;

wherein said master baseband processor is configured to select said first mode or said second mode and control a plurality of shared interface functions; and wherein audio data is passed from the master baseband processor to the slave baseband co-processor in the second mode.

19. A dual mode digital communication device in accordance with claim 18, said shared interface functions including a reset control.

* * * * *